Figure 1:
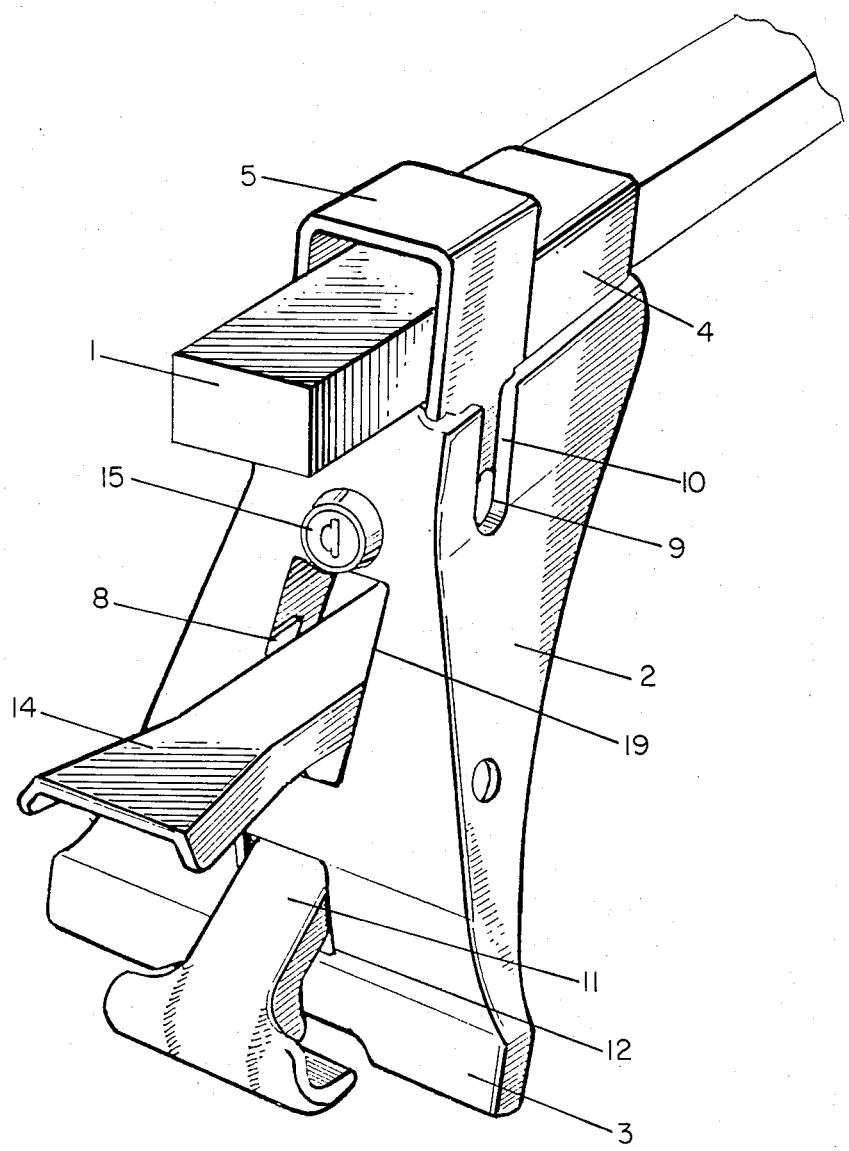

United States Patent [19]

Eklund

[11] Patent Number: 4,496,089
[45] Date of Patent: Jan. 29, 1985

[54] LOAD HOLDER

[76] Inventor: Tore Eklund, Larstorpsvägen 13, S-591 70 Motala, Sweden

[21] Appl. No.: 517,648

[22] Filed: Jul. 27, 1983

[30] Foreign Application Priority Data

Aug. 2, 1982 [SE] Sweden .............................. 82045485

[51] Int. Cl.³ ............................................... B60R 9/04
[52] U.S. Cl. ................................... 224/329; 224/320; 224/321; 224/322
[58] Field of Search ............... 224/329, 320, 321, 322, 224/325, 331

[56] References Cited

U.S. PATENT DOCUMENTS 3,153,501 10/1964 Binding ................................ 224/320
3,702,167 11/1972 Olson ................................... 224/331

FOREIGN PATENT DOCUMENTS 0037456 10/1981 European Pat. Off. ............ 224/321

Primary Examiner—Steven M. Pollard
Attorney, Agent, or Firm—Witherspoon & Hargest

[57] ABSTRACT

The invention relates to a load holder adapted to be mounted on the roof of a vehicle and having a rod-shaped carrying element which at its ends latchably is engaged in support legs which with the aid of tensioning hooks are adapted to be mounted at the drip moulding of the vehicle, said tensioning hooks are adapted to be operated with the aid of an operating member working according to the principle of eccentricity. According to the invention a clamping yoke (5) is provided to latch the carrying element, said clamping yoke with the aid of a stud (6) being shiftably journalled in an oblong guiding groove (7) in a protrusion (8), the operating arm (14) for operating the tensioning hook (11) also being hingedly supported on the stud (6) causing the clamping yoke (5) being shifted simultaneously with the operation of the tensioning hook (11).

9 Claims, 4 Drawing Figures

LOAD HOLDER

The invention refers to a load holder intended to be mounted on the roof of a vehicle, in particular a load holder of the type comprising a carrying element in the shape of a rod, ordinarily of square or C-profile, said carrying element at its ends being in locking engagement with support legs adapted to be mounted with the aid of tensioning hooks on the drip moulding, said tensioning hooks being adapted to be operated with the aid of an operating member actuated according to the principle of excentricity.

Load holders of the type mentioned above are previously known in a great number of different constructions all of which are subject to drawbacks rendering the devices unnecessarily complicated and difficult to use and/or expensive for the buyer. Thus the mounting of all previously known load holders is complicated due to the fact that for latching the carrying element to the support leg during adjustment of the length of the load holder it is necessary to brace the carrying element to the support leg either with the aid of a tool such as a screw driver or a socket head wrench or with the aid of a particular rotary handle.

As due the last years it has become more and more common to carry comparatively expensive and theft-enticing objects such as skis, bicycles, surfing boards and the like on load holders and car roof structures, there has also been an increasing need of means enabling both the load holder and the load to be locked; in particular, this is required by the insurance companies if compensation is to be paid. At present there is one load holder on the market in which the operating member for actuating the tensioning hook is a rotary handle and as an extra equipment for this load holder there is available a rotary handle adapted to be locked substantially belonging to the type used for fuel tank covers, which means that in the locked position the handle is idling. In addition to the fact that this handle which thus must be purchased as extra equipment is relatively expensive, it does not either completely prevent theft of the load because the carrying element of the load holder may simply be pulled out after loosening the clamping means. In order to eliminate this risk the known load holder may additionally be complemented by a cap, adapted to be latched after having been swung down over the ends of the carrying elements to prevent extraction thereof. In order to render the load holder fully theft-proof it must additionally be complemented by specific latching means locking the load itself to the carrying elements, such as lockable ski holders, bicycle holders or holders for wind-surfing boards. Obviously, such a previously known load holder provided with the extra equipment mentioned above will be extremely expensive in addition to the fact that the construction is particularly unpractical due to the multiplicity of separately lockable devices.

Thus it is the purpose of the present invention to propose an improved load holder of the type initially mentioned eliminating all the above drawbacks of previously known devices.

This purpose is achieved with the aid of a device of the type indicated in the claims which also indicate the particular characteristic features of the invention.

Figure 2:
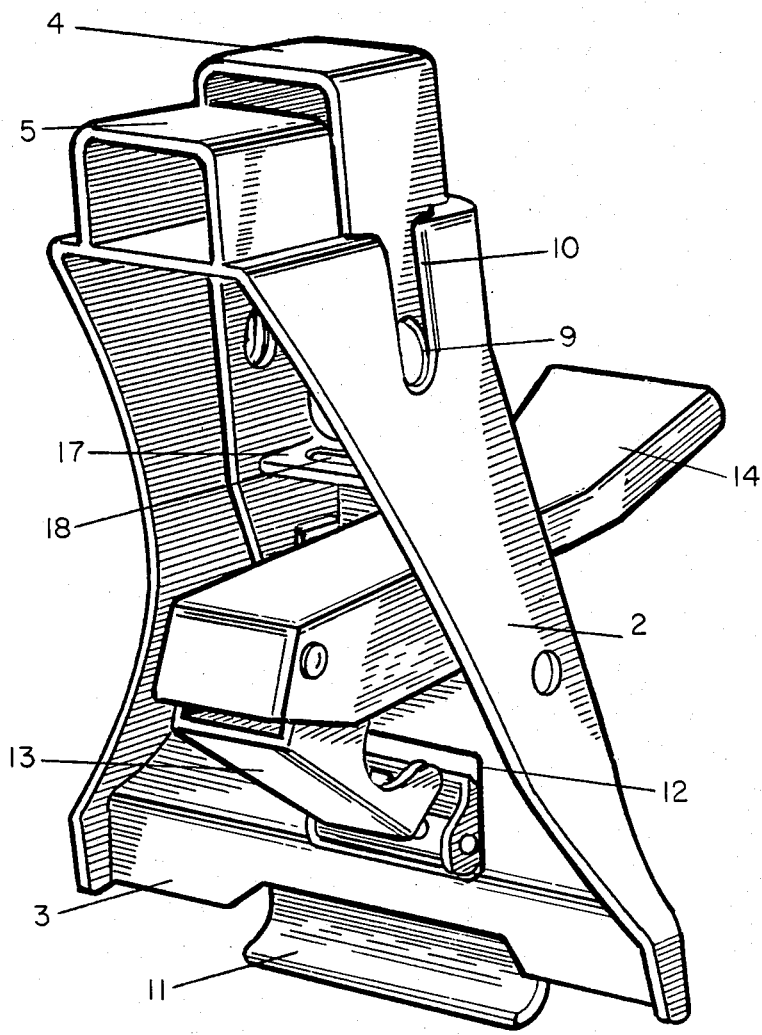
Figure 3:
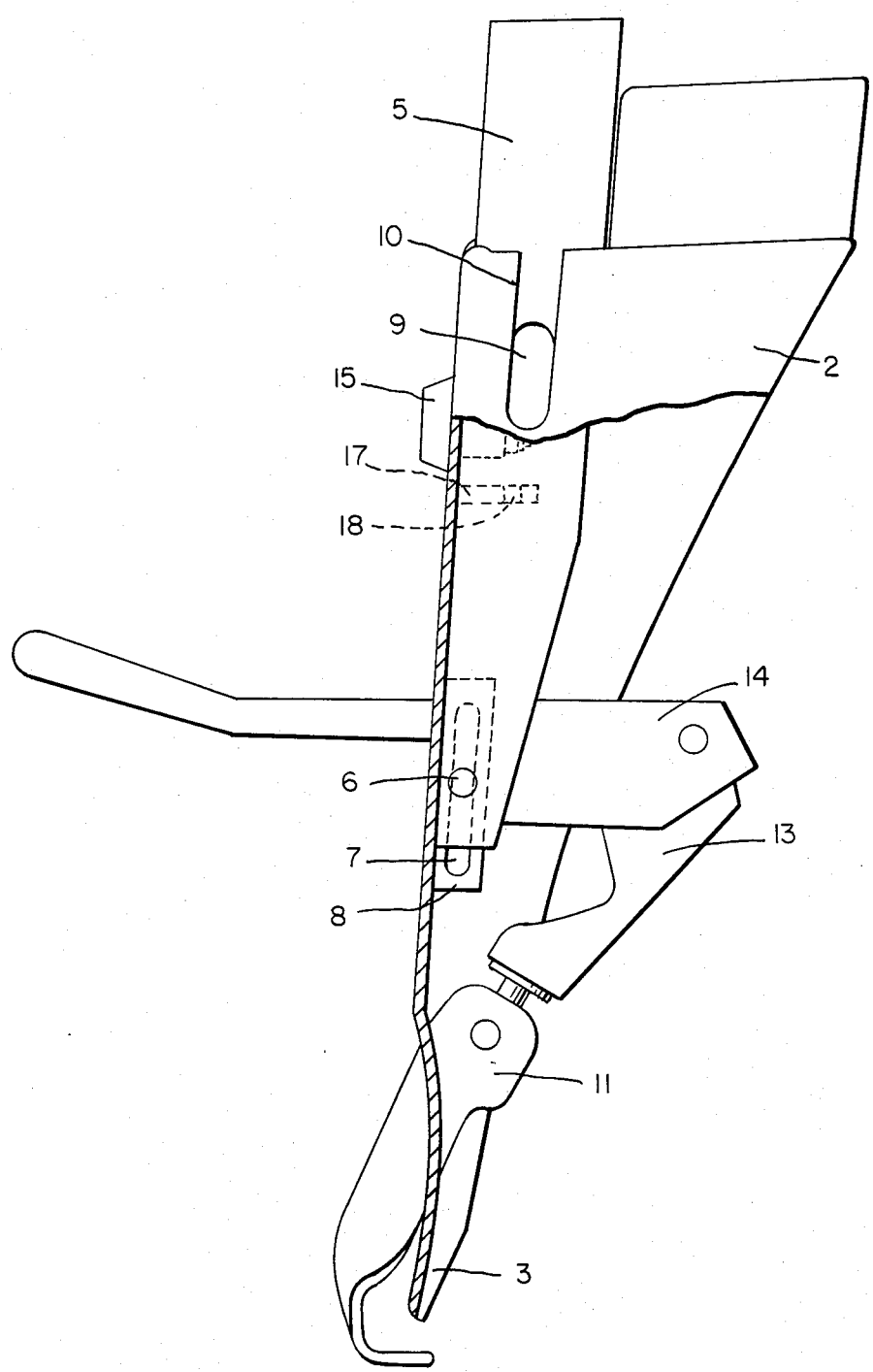
Figure 4:
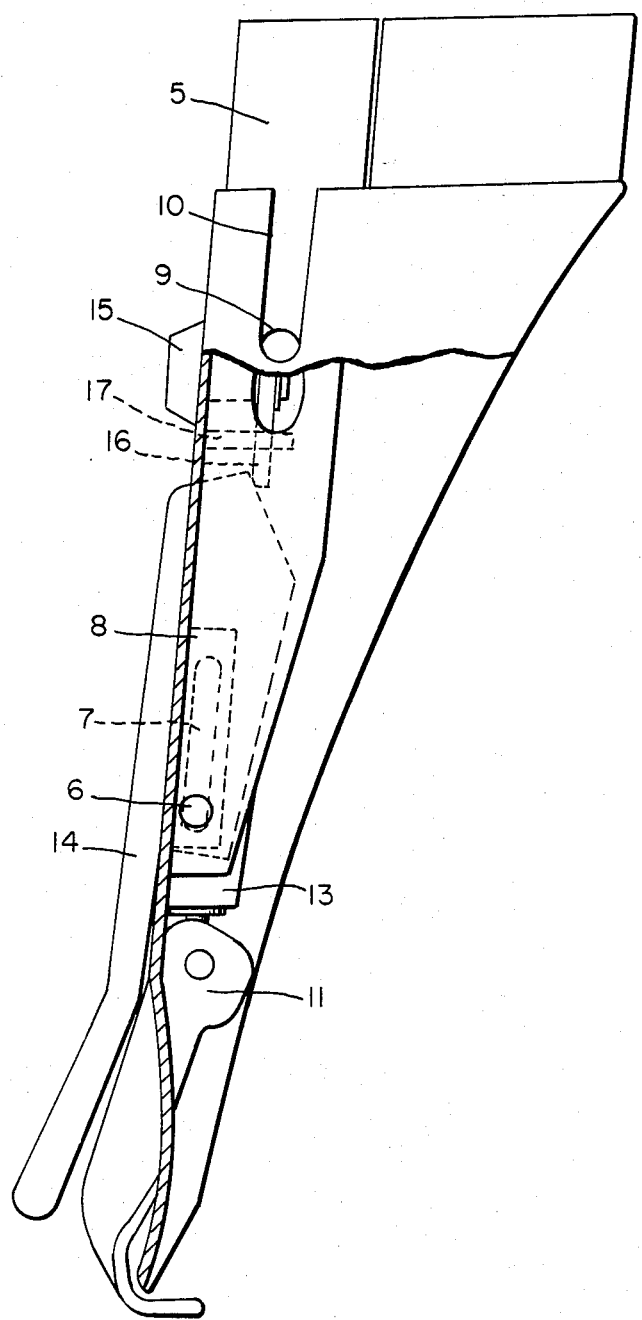

The invention will be described in detail hereafter by reference to the attached drawings in which FIG. 1 is a perspective view of one end portion of the load holder according to the invention, FIG. 2 is a perspective view of the support leg shown in FIG. 1 viewed from the side which in the mounted condition is turned inwardly towards the vehicle, FIG. 3 is an elevation with certain parts cut away of the support leg with the operating arm in the lifted condition for release of the tensioning hook, and FIG. 4 is a view similar to FIG. 3 showing the operating arm in the depressed position for clamping the load holder in position.

As appears from FIG. 1, the load holder according to the invention comprises a carrying element 1 and, at each end thereof, a support leg 2 (only one shown). The carrying element 1, in the shown embodiment, has a rectangular profile but may also have some other kind of profile such as a round one; however, the rectangular profile appears preferable from the point of view of security.

The support leg comprises a body, preferably manufactured from bent and punched plate having a lower foot 3 adapted to contact the drip moulding of the vehicle, whereas at the upper end a steady holder 4 is provided. The holder 4 is preferably weldingly attached to the body and adapted to receive the carrying element 1 which is inserted therein when the load holder is mounted. Adjacent the holder 4 an opening is punched out of the body to receive a yoke 5 for clamping the carrying element 1 as will be described below. As most clearly appears from FIG. 3 the yoke 5 is journalled on a stud 6 which in turn is journalled in an oblong guide groove 7 provided in a protrusion 8 suitably forming a punched and inwardly bent part of the body itself. By this way of journalling the yoke 5 is adapted to be shifted up and down in the support leg 2 over a distance corresponding to the length of the guiding groove 7. The yoke 5 on its sides is provided with attachment holes 9 for locking load hooks as will be described later. Adjacent the attachment holes 9 the body of the support leg 2 is provided with a groove 10 shaped and arranged so that in the elevated position of the yoke 5 the groove 10 completely exposes the attachment hole 9 but in the depressed position of the yoke 5 partly covers the attachment hole 9.

In a conventional way the support leg 2 is in addition provided with a tensioning hook 11 adapted to grip around the drip moulding of the vehicle. The tensioning hook extends through recess 12 in the body of the support leg and via a threaded stud enabling the length of the tensioning hook to be adjusted it is hingedly connected to an operating arm 14 which extends through an opening 19 in the body of the support leg for convenient operation from the outside of the support leg. According to the invention, however, both the operating arm 14 and the yoke 5 are journalled on stud 6 moving in the guide groove 7 causing the operating arm 14 when operated for tensioning hook 11 below the drip moulding of the vehicle also to pull down the yoke 5 for latching the carrying element 1 as will appear from the following description of the function.

As most clearly appears from FIGS. 3 and 4 the support leg is also provided with a lock 15 for locking the operating arm 14 in the position shown in FIG. 4 when the support leg 2 is tensioned to the vehicle. Suitably a conventionally key-operated lock is used having a locking hook 16 which when the lock is moved to the closed position is turned to a position overlying the operating arm 14 preventing the movement thereof in a direction for release of the tensioning hook 11. However, such an arrangement is not fully satisfactory, because the operating arm 14 comparatively easily may be broken-off so that the locking hook 16 is deformed, there is provided, according to the invention, a locking clamp 17 which suitably is punched and bent from the body of the support leg 2 itself. The locking clamp is provided with a groove 18 through which the locking hook 16 is inserted when moved to the locking position, thus enabling the locking clamp to stabilize the locking hook and prevent it from becoming deformed when the operating arm 14 is exposed to braking forces.

It may also be mentioned that it is suitable from the point of view of manufacture that both the locking clamp 17 and the protrusion 8 are shaped by bending those parts of the body as correspond to aperture 19 through which the operating arm 14 extends.

On conventional load holders there are ordinarily provided pads of plastic or rubber on the tensioning hooks and the feet of the support legs to prevent the vehicle from becoming damaged when the support leg is braced, however, such pads tend to be destroyed and lost and accordingly do not form a satisfactory solution of this problem. According to the invention it is therefore proposed to coat at least the tensioning hook and the foot of the support leg, but suitably the support leg as a whole and also the carrying element with a plastic substance having very good adhesion and wear resistance.

When the load holder according to the invention is to be mounted one support leg 2 each is pushed onto the ends of a carrying element 1, the operating arms 14 of the support legs being in the position shown in FIG. 3 and the yokes 5 being lifted a distance from their lower most position so that the carrying element 1 can be inserted into and become enclosed within both the holder 4 and the yoke 5 of the support leg 2 in question. Thereafter the feet 3 of the support legs 2 are loosely positioned into the drip mouldings of the vehicle while the distance between the support legs is adjusted in respect to the width of the vehicle in question. In a conventional way thereafter the length of the tensioning hook 11 is adjusted by turning the tensioning hook in clockwise or counter-clockwise direction to screw threaded stud into or out of the intermediary link 13.

When the load holder has been adjusted to suite the vehicle in question it is tightened by turning the operating arm 14 in a downward direction to the position shown in FIG. 4. Due to the common journalling of the operating arm 14 and the yoke 5 on stud 6 in the guide groove 7 it will be appreciated that with the tensioning hook 11 acting as a support against the drip moulding of the vehicle the movement of operating arm 14 to the position shown in FIG. 4 will cause the yoke 5 to move in a downward direction to effectively latch the carrying element 1. Due to the sliding position of stud 6 in guide groove 7 the tensioning force will be distributed between the tensioning hook 11 and the yoke 5 for latching, on the one hand, the support leg 2 to the drip moulding and, on the other hand, the carrying element 1 to the support leg 2. Thereafter lock 15 is operated as described above to lock the operating arm 14 in the position shown in FIG. 4, this lock thereby simultaneously preventing the support leg to be removed from the vehicle and the carrying element 1 to be pushed out of the support leg.

If it is desired to lock the load to the load holder, a load hook may be used which suitably is made from a round bar material which at its lower end is bent substantially 90° and which at its extreme end is provided with a thickened portion. The upper end of the load hook may be adapted to the specific load to be transported, such as skis, bicycles, wind-surfing boards and the like. The latching of the load hook is performed in such a way with the support leg in the position of FIG. 3 with the operating arm 14 lifted and the yoke 5 in its elevated position, the thickened lower end is inserted through the attachment hole 9 of the yoke 5 this hole in this operating position being completely uncovered by groove 10 in the support leg 2. When the support leg is secured in position by operation of the operating arm 14, the yoke, as mentioned before, will be moved to its position for locking the carrying element 1, causing the attachment hole 9 to be shifted downwardly in the recess 10 so that only the upper part thereof corresponding to the dimension of the rod material of the load hook is uncovered through groove 10 whereby the thickened portion will be latched behind the yoke 5 and the body of the support leg.

It will appear from the above description that with the aid of the load holder according to the invention it is possible simultaneously and with one single manually performed action to tension the support leg to the vehicle, the carrying element 1 to the support leg and also the load to the load holder. Due to the fact that all these tensioning actions are performed by means of the operating arm 14 it is also possible to protect with the aid of only one lock acting on the operating arm 14 as described above completely to protect the load against theft in a way which in connection with conventional equipment requires at least three separate locks.

While a specific embodiment of the invention has been shown and described, it should be obvious to the expert that the invention can be complemented and modified within the frame of the attached claims without deviation from the basic inventive idea.

I claim:

1. A load holder comprising
    a support leg having an upper end for attachment to one end of an elongated carrying element and a lower end for engagement with an upper surface of drip moulding of a vehicle, said upper end including an opening;
    a yoke extending into said opening of said leg, said yoke having an upper and lower portion and being slidably moveable relative to said leg, said upper portion including an opening for insertion of said carrying element and said lower portion including a stud extending therefrom;
    a first protrusion, having a guide groove therein, extending from said leg at a position between said upper and lower ends of said leg, said stud extending into said groove in said first protrusion;
    an operating arm extending through an opening in said support leg and having one end for movement by an operator, and a second end;
    a tensioning arm extending through an opening in said support leg and having one end including a tensioning hook for engagement with a lower surface of said drip moulding, and a second end pivotally attached to said second end of said operating arm, whereby when said operating arm is rotated about said pivotal attachment so that said stud moves to a first position relative to said guide groove said yoke is caused to move away from said upper end of said leg and said tensioning hook is caused to move away from said lower end of said leg, and when said operating arm is rotated about said pivotal attachment so that said stud moves to a second position relative to said guide groove said yoke is caused to move towards said upper end of said leg and said tensioning hook is caused to move towards said lower end of said leg.

2. The load holder of claim 1 wherein said yoke includes an aperture therethrough positioned between said upper and lower portions and said support leg includes an aperture therethrough positioned between said upper and lower ends, said yoke aperture and said leg aperture being completely exposed relative to each other when said stud is in said first position, and said yoke aperture being in part covered by said leg when said stud is in said second position.

3. The load holder of claim 1 including means for locking said operating arm in place when said stud is in said second position.

4. The load holder of claim 3 wherein said locking means includes a second protrusion, having a groove therein, extending from said leg at a position between said upper and lower ends thereof and adjacent to said second end of said operating arm when said stud is in said second position, and a key operated locking hook pivotable through said groove, in said second protrusion, and into locking engagement with said second end of said operating arm when said stud is in said second position.

5. The load holder of claim 4 wherein said opening in said support leg through which said operating arm extends is formed from a first punched portion of said leg which has been bent relative to said leg to form said first protrusion and a second punched portion of said leg which has been bent relative to said leg to form said second protrusion.

6. The load holder of claim 1 wherein said opening in said support leg through which said operating arm extends is formed from a first punched portion of said leg which has been bent relative to said leg to form said first protrusion.

7. The load holder of claim 1 wherein said second end of said tensioning arm is pivotally attached to said second end of said operating arm through an intermediate link one end of which is pivotally attached to said second end of said operating arm and another end of which is pivotally and adjustably attached to said second end of said tensioning arm by a threaded stud.

8. The load holder of claim 1 wherein said tensioning hook and said lower end of said leg comprise a plastic material having good adhesive and wear resistance properties.

9. A load holder comprising
a carrying element having a first end and a second end;
first and second support legs each of which has an upper end for attachment to said carrying element and a lower end for engagement with an upper surface of drip moulding of a vehicle, the upper end of each of said support legs including an opening;
a first yoke extending into said opening of said first leg and a second yoke extending into said opening of said second leg, said first and second yokes having an upper and lower portion and being slidably moveable relative to said first and second legs, respectively, each of said upper portions including an opening through which extends said carrying element and each of said lower portions including a stud extending therefrom;
a first protrusion, having a guide groove therein, extending from said first leg at a position between said upper and lower ends of said first leg and a second protrusion, having a guide groove therein, extending from said second leg at a position between said upper and lower ends of said second leg, said stud of said lower portion of said first yoke extending into said groove in said first protrusion and said stud of said lower portion of said second yoke extending into said groove in said second protrusion;
a first operating arm extending through an opening in said first support leg and having one end for movement by an operator, and a second end, and a second operating arm extending through an opening in said second support leg and having one end for movement by an operator, and a second end;
a first tensioning arm extending through an opening in said first support leg and having one end including a tensioning hook for engagement with a lower surface of said drip moulding, and a second end pivotally attached to said second end of said first operating arm, and a second tensioning arm extending through an opening in said second support leg and having one end including a tensioning hook for engagement with a lower surface of said drip moulding, and a second end pivotally attached to said second end of said second operating arm, whereby when said operating arm and said stud are in a first position relative to said guide groove said yoke is in a disengaged position relative to said carrying element and said tensioning hook is spaced from said lower end of said support leg, and when said operating arm said stud are rotated about said pivotal attachment to a second position relative to said guide groove said yoke is in an engaged position relative to said carrying element and said tensioning hook is moved towards said lower end of said support leg.

* * * * *